Figure 1:
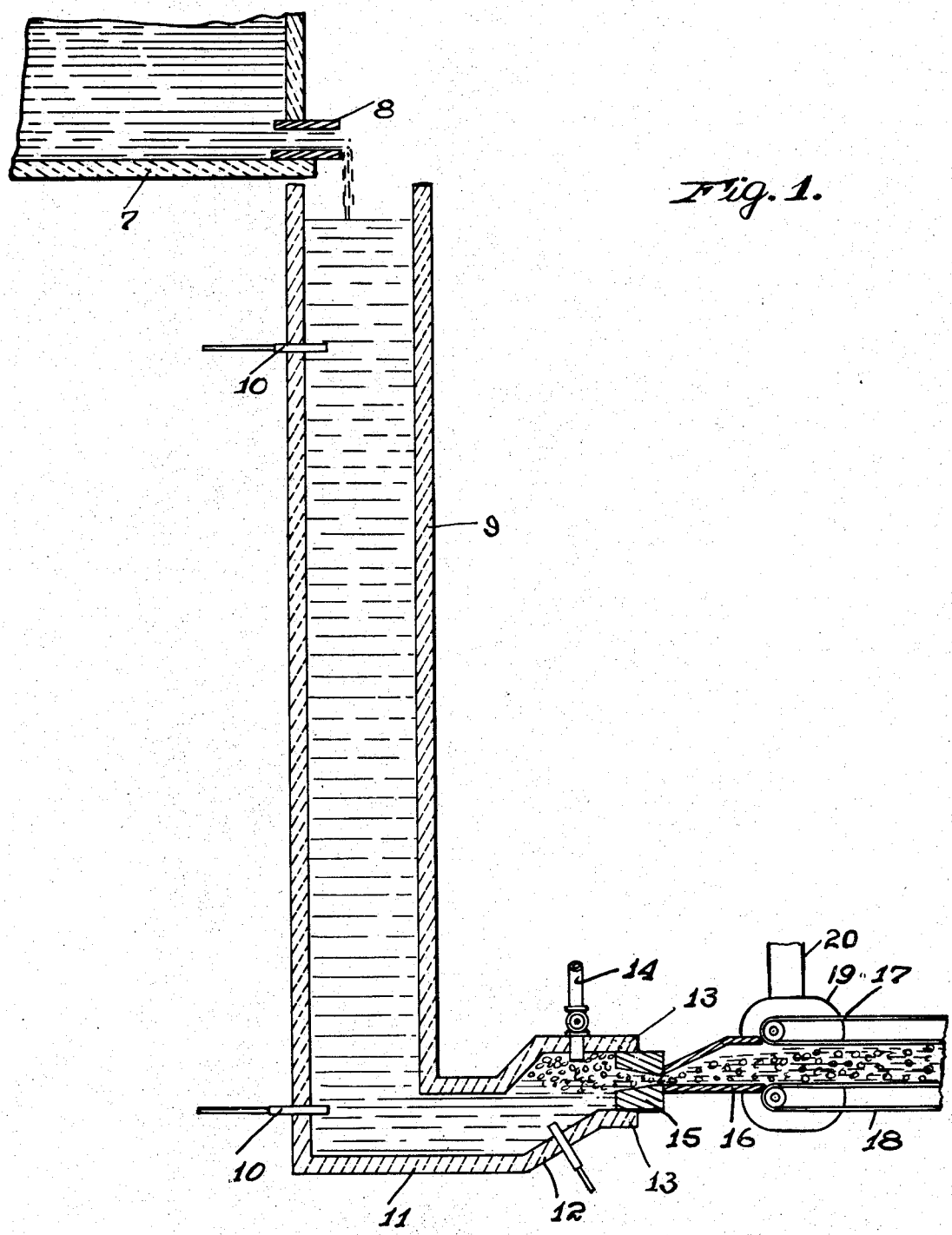

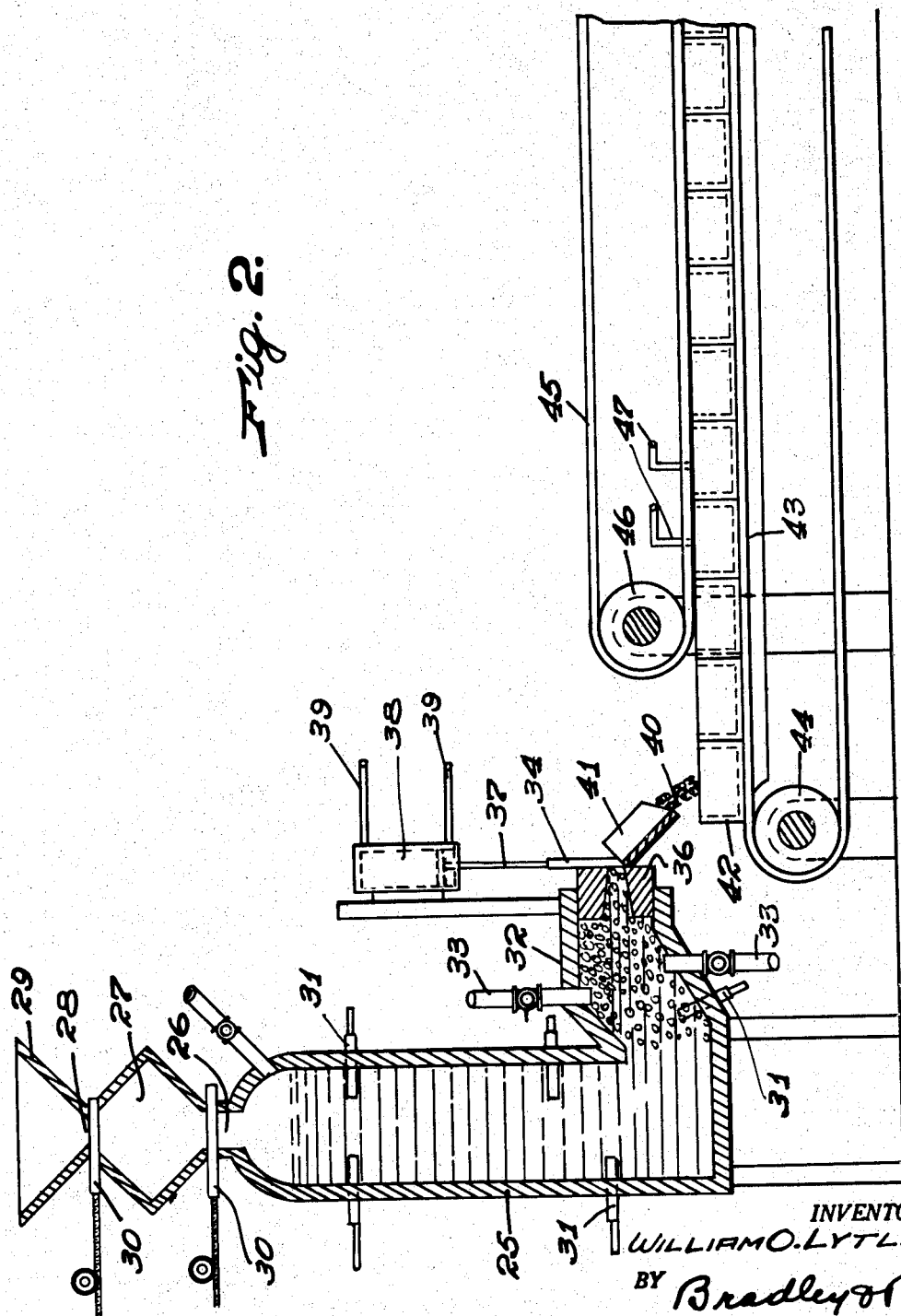

Patented Sept. 17, 1940

2,215,223

UNITED STATES PATENT OFFICE 2,215,223

POROUS MATERIAL MANUFACTURE

William O. Lytle, New Kensington, Pa., assignor to Pittsburgh Plate Glass Company, Allegheny County, Pa., a corporation of Pennsylvania Application December 30, 1937, Serial No. 182,463

4 Claims. (Cl. 49—14)

The present invention relates to the manufacture of glass products and it has particular relation to processes of preparing highly porous or cellular bodies of glass by introducing a gas or gassing agent into glass in molten state.

One object of the invention is to provide a process of preparing porous or cellular glass which is substantially continuous in operation and in which the mechanical difficulties of distributing the bubbles or bubble-forming materials in the glass, and the losses of gases from the glass during distribution are reduced to a minimum.

This and other objects will be apparent from consideration of the following specification.

The use of bodies of glass containing numerous small bubbles or vesicles distributed therein to form a porous mass, as a heat and sound insulating medium, has heretofore been proposed. It has been suggested that such bodies be formed by application of vacuum to glass in a mold in order to expand the gases absorbed therein. In such processes the bubble formation may be promoted by addition of a refractory solid such as silicon carbide to provide points of departure. Incorporation of a gassing medium such as water, or carbonaceous material, or the like, into a body of molten glass which is then allowed to expand under the action of the gases generated to fill a suitable mold has also been suggested. These processes as heretofore proposed have been intermittent in operation and the time and labor consumed therein have been excessive. Moreover, in practicing them, uniform distribution of the solid material in the glass without loss of the evolved gas was difficult.

The present invention involves the provision of a process of preparing a cellular glass in which molten or at least plastic glass containing bubbles of a gas such as carbon dioxide, steam, or air are forced continuously or intermittently by pressure from a column or other suitable receptacle through an orifice placed at or adjacent to the bottom of the column while molten glass, glass-forming ingredients or crushed glass are added continuously or intermittently as required at the top of the container or column to maintain an adequate level of the material in the column.

For a better understanding of the invention reference may be had to the drawings in which Fig. 1 is a cross-sectional view of a suitable embodiment of apparatus for practicing the invention and Fig. 2 is a cross-sectional view of a slightly modified form of the invention.

In the form of the invention illustrated, glass in molten state is contained in a container such as a pot or tank 7 and is fed through a nozzle or spout 8 into the top of the container 9 of columnar form which may be heated by passage of electrical current between electrodes 10 suitably spaced therein, or resistance coils or even by heated gases in suitable tubes. The latter container is provided at or adjacent to the lower extremity thereof with a laterally-extending branch 11 having upwardly inclined portion 12 that terminates in a horizontally-extending portion 13, which portion is fed with a bubble-forming material such as air or steam, by means of an inlet conduit 14. Obviously, if gases or like material is to be introduced into the glass simple hydrostatic pressure will be sufficient. However, if pulverulent material such as calcium carbonate or a porous material such as vermiculite is to be introduced a suitable screw conveyor (not shown), or other instrumentality, for forcing the material into the stream of glass, will be required. Glass in crushed or cullet form may be introduced at the top of column 9. A mixture of sand and other glass-forming constituents may also be introduced and melted down to form glass in the column.

The horizontal portion of the branch 11 terminates in an inwardly flared tip 15 that discharges into an outwardly flaring nozzle 16, thereby providing a Venturi-like throat. The nozzle discharges between a pair of vertically spaced conveyors 17 and 18, or rollers formed of a heat-resistant material, which conveyors carry away the sheet of cellular glass and also assist in forming it to uniform thickness.

For purposes of increasing or maintaining the porosity of the cellular sheet while it is still plastic a vacuum chamber 19 may be provided to enclose the rear ends of conveyors 17 and 18 and may be joined to nozzle 16. A conduit 20 connects the chamber with a source (not shown) of vacuum.

The mode of operation of this embodiment of apparatus is practically self evident. Molten glass, from tank 7, is allowed to discharge into the column 9 or pulverized glass, or glass-forming ingredients are simply added to the column 9 and are then melted down into liquid state. The molten glass thus formed is forced outwardly through the passage 11 under the hydrostatic pressure of the head of molten glass in the column and preferably just prior to its entrance into the tip 15 it is charged with gas, either directly by injecting a gas such as air, or by forcing in a stream of pulverized calcium carbonate or vermiculite, or similar material which by reason of the heat and/or chemical action from the molten glass liberates gas to form numerous bubbles. These bubbles as the material passes through the tip are uniformly distributed throughout the stream of moving material. As the plastic mass emerges from the tip into the nozzle 18 the heated gases expand gradually as the nozzle flares outwardly and thereby provide a uniformly porous body, the apparent specific gravity of which can be controlled at will by suitable regulation of the rate of addition of gas or gasifying agent. The conveyors 17 and 18 by contacting with the upper and lower surfaces of the moving material, prevent undue expansion of all or of portions thereof and smooth it out to uniform thickness. The material on the conveyors passes through a leer (not shown), for purposes of annealing to relieve any internal strains therein. Subsequently the cellular product is cut into blocks of desired dimensions.

In Fig. 2 is shown means for molding the cellular glass into blocks as it flows out of the container. In this form of the invention a pot or tank 25 which corresponds to the container 9, and like the container 9 may be open at the upper extremity, or as shown in the drawing is closed and is provided with means for introducing molten glass, or solid but pulverized glass, or glass-forming ingredients. Such means comprises an inlet 26 opening upward into a chamber 27 constituting an air lock which in turn communicates through throat 28 with a hopper 29. Suitable valves, e. g. slide valves 30, are disposed respectively in inlet 26, and throat 28, and admit of dropping the contents of hopper 29 into air-lock chamber 27 and from there into the container 25 without substantial loss of pressure in the latter. Electrodes 31 corresponding to electrodes 10, are disposed in container 25 to obtain or maintain a desired temperature in the glass.

A laterally-extending branch 32 at or near the lower extremity of the container having inlets 33 for admission of a gas and substantially corresponding to branch 11 will not be described in detail. In this form of the invention, the nozzle corresponding to nozzle 16 is omitted. However, a shear blade 34 sliding upon or adjacent to the face of the air outlet tip 36 similar to tip 15 is disposed transversely of the path of flow of the cellular glass. The shear blade is rigidly secured upon the extremity of a piston rod 37 which reciprocates within a cylinder 38 to which any suitable actuating fluid may be admitted through conduits 39 that discharge into opposite ends thereof. Portions or gobs of plastic cellular glass severed by the shear blade drop into a downwardly sloping chute 41, the upper extremity of which is disposed below the tip 36.

Molds 42 are disposed at the lower extremity of the chute in position to receive the gobs of fluid cellular glass and may be disposed upon any suitable stationary or movable support. A stationary platform upon which the molds are placed or along which they are slid either manually or mechanically would be the simplest support. However, in the drawings they are shown as traveling upon an endless conveyor 43 of belt or chain type, trained about a roller or sprocket 44. They might also be carried upon a turret construction revolving in a horizontal plane in a manner similar to that of the molds in a conventional bottle blowing machine. A second belt or conveyor 45 trained about roller 46 is disposed above and in parallelism to conveyor 43 in position to contact with the molds and moves in synchronism therewith to provide a moving cover therefor.

In some cases it may be desirable to increase the expansion or maintain the form of the glass in the molds by application of a vacuum thereto. This is easily accomplished by providing openings in the conveyor 45 to register with the molds 42. Conduits 47 having close fitting, relatively refractory terminals, may then be manually inserted in these openings and the gases in the molds drawn off. After expansion of the contents of a mold the conduit may be withdrawn.

In the operation of the apparatus, pulverized glass or molten glass is introduced at the top of columnar tank 25 and when sufficiently fluid or if already fluid, while still in that state, passes downwardly through the tank and outwardly through branch 32. Near the tip of the latter, gases are introduced into the molten mass, which preferably is under substantial pressure generated hydrostatically by the molten glass in column 25 and/or by the action of the gases introduced or liberated in the apparatus. Assuming that the shear blade 34 is retracted the mixture of gas and air will tend to flow out and when a sufficient body has been emitted fluid is admitted to cylinder 38 to reciprocate the shear blade, thus severing a portion or gob of the glass which passes down the chute 41 into a mold 42, upon conveyor 43. In the molds it gradually expands, which expansion may be increased by evacuating the molds. Conveyor 45 contacting with the top of the mold as it passes away from the chute limits the expansion of the mass and provides a smooth upper surface.

It will be appreciated that calcium carbonate, or other gassing agent, admixed with crushed glass or with glass-forming ingredients may be fed through hopper 29 and upon melting or sintering of the glass or glass-forming materials, carbon dioxide will be generated by the gassing agent to produce bubbles in the glass. If the gassing agent is thus supplied, conduits 14 and 33 need not be employed.

In the embodiments of the invention herein disclosed, the glass as it approaches the outlet of the lateral branch is moving in a relatively restricted channel and therefore at substantial speed. All of these factors promote uniformity of admixture of the gas in the glass. Moreover, the upward bend in the lateral branch insures that the bubbles as they are formed will be carried forward concurrently with the glass rather than flowing backward into the main chamber.

Although only the preferred forms of the invention are shown and described, it will be apparent that the numerous modifications may be made therein without departure from the spirit of the invention or the scope of the appended claims.

What I claim is:

1. A process of preparing cellular glass which comprises flowing molten glass as a stream under substantial pressure through a passage having a restricted throat, introducing gases as bubbles into the portion of the mass under pressure adjacent to the throat while leaving the remote portions substantially free of gases, flowing the gasified material under pressure through the throat portion of the passage, and into a zone of relatively reduced pressure whereby to expand the gases and to provide a coherent highly cellulated body of glass, and cooling the body into a solid state.

2. A process of preparing cellular glass which comprises filling a vertical column with molten glass, the molten glass at the bottom of the column being under substantial hydrostatic pressure resulting from the glass above, introducing gas into the portion of molten glass under pressure, then flowing the gasified material under pressure into a zone of relatively reduced pressure whereby to allow the gases to expand and form a highly cellulated coherent body, then cooling the body.

3. A process of forming cellular glass which comprises filling a vertical column with molten glass, the lower portion of which is under substantial hydrostatic pressure, flowing the glass at the bottom of the column laterally and forcing it through a restricted orifice into a zone of relatively reduced pressure, admixing gas with the molten glass, while it is flowing laterally and before passing through the orifice, whereby the gas is expanded to provide a highly cellulated body.

4. An apparatus for forming multi-cellular glass comprising a vertical column constituting a container for a head of molten glass in which the glass at the bottom of the column is under substantial hydrostatic pressure from the head of molten glass in the column, said column having adjacent to the bottom thereof, a laterally and upwardly-projecting branch, adapted to be filled with the molten glass under hydrostatic pressure, the branch being provided at the tip thereof with a restricted nozzle discharging into a zone of substantially less pressure than that of the hydrostatic head and conduit means for introducing gases into the lateral branch back of the restricted nozzle, but in such manner as to prevent backward flow of the bubbles of gas into the column, whereby the molten glass containing gases admixed therewith is forced through the restricted nozzle by hydrostatic pressure of the head of molten glass into the zone of relatively reduced pressure, in order to expand the gases and form a highly cellulated body.

WILLIAM O. LYTLE.